(12) United States Patent
Chung et al.

(10) Patent No.: US 10,274,031 B1
(45) Date of Patent: Apr. 30, 2019

(54) BRAKE DISK AND MANUFACTURING METHOD THEREOF

(71) Applicants: HYUNDAI MOTOR COMPANY, Seoul (KR); KIA Motors Corporation, Seoul (KR)

(72) Inventors: Min Gyun Chung, Yongin-si (KR); Yoon Cheol Kim, Suwon-si (KR); Yoon Joo Rhee, Suwon-si (KR); Byung Chan Lee, Suwon-si (KR); Jae Young Lee, Yongin-si (KR)

(73) Assignees: HYUNDAI MOTOR COMPANY, Seoul (KR); KIA Motors Corporation, Seoul (KR)

( * ) Notice: Subject to any disclaimer, the term of this patent is extended or adjusted under 35 U.S.C. 154(b) by 0 days.

(21) Appl. No.: 15/963,577

(22) Filed: Apr. 26, 2018

(30) Foreign Application Priority Data

Dec. 13, 2017 (KR) .......................... 10-2017-0171569

(51) Int. Cl.
| | | |
|---|---|---|
| *C23C 8/26* | (2006.01) | |
| *F16D 65/12* | (2006.01) | |
| *C23C 8/02* | (2006.01) | |
| *C22C 37/10* | (2006.01) | |

(52) U.S. Cl.
CPC ............ *F16D 65/125* (2013.01); *C22C 37/10* (2013.01); *C23C 8/02* (2013.01); *C23C 8/26* (2013.01); *F16D 2200/0013* (2013.01); *F16D 2250/0007* (2013.01); *F16D 2250/0046* (2013.01); *F16D 2250/0053* (2013.01)

(58) Field of Classification Search
CPC ........... F16D 65/125; F16D 2250/0053; F16D 2200/0013; F16D 2250/0007; F16D 2250/0046; C23C 8/26; C23C 8/02; C22C 37/10

See application file for complete search history.

(56) References Cited

U.S. PATENT DOCUMENTS

| | | | | |
|---|---|---|---|---|
| 2008/0000550 A1* | 1/2008 | Holly | ..................... | C21D 1/607 148/217 |
| 2012/0037466 A1* | 2/2012 | Lee | ........................ | B22D 19/00 188/218 R |

FOREIGN PATENT DOCUMENTS

| | | |
|---|---|---|
| JP | S63-259232 A | 10/1988 |
| JP | 2005-069310 A | 3/2005 |
| KR | 10-1288830 B1 | 7/2013 |

* cited by examiner

*Primary Examiner* — Jessee R Roe

(74) *Attorney, Agent, or Firm* — McDonnell Boehnen Hulbert & Berghoff LLP

(57) ABSTRACT

A method of manufacturing a brake disk made of gray cast iron is disclosed. The method includes casting a disk body using gray cast iron containing 3.1 wt % to 3.7 wt % of C; machining a surface of the cast disk body; nitriding the disk body by exposing the machined surface to a temperature in the range of 540° C. to 580° C. for 50 min to 70 min, and coating the nitrided disk body.

3 Claims, 8 Drawing Sheets

[FIG.1]
PRIOR ART
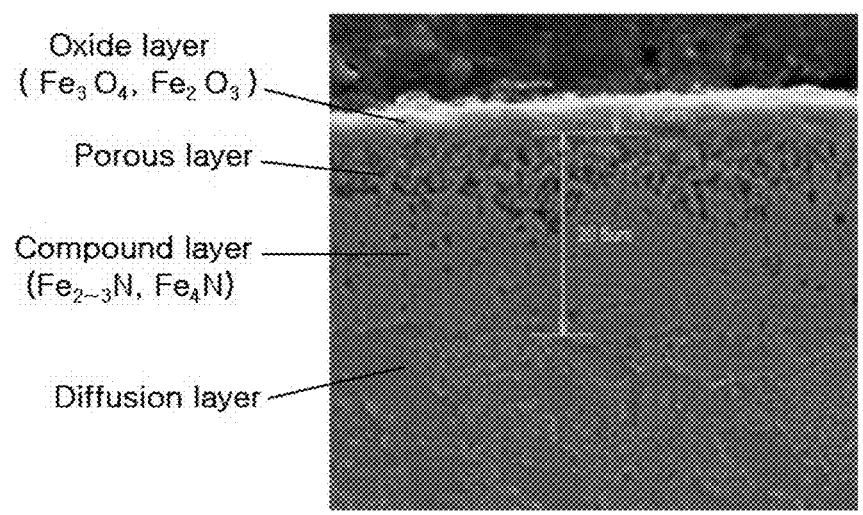

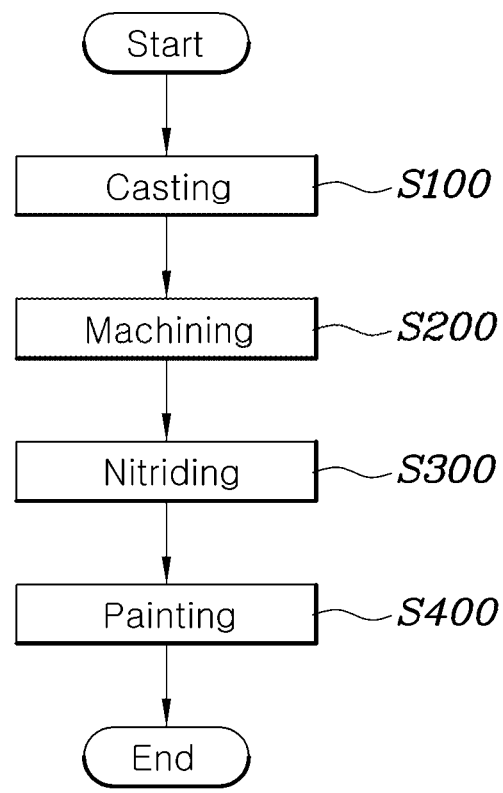

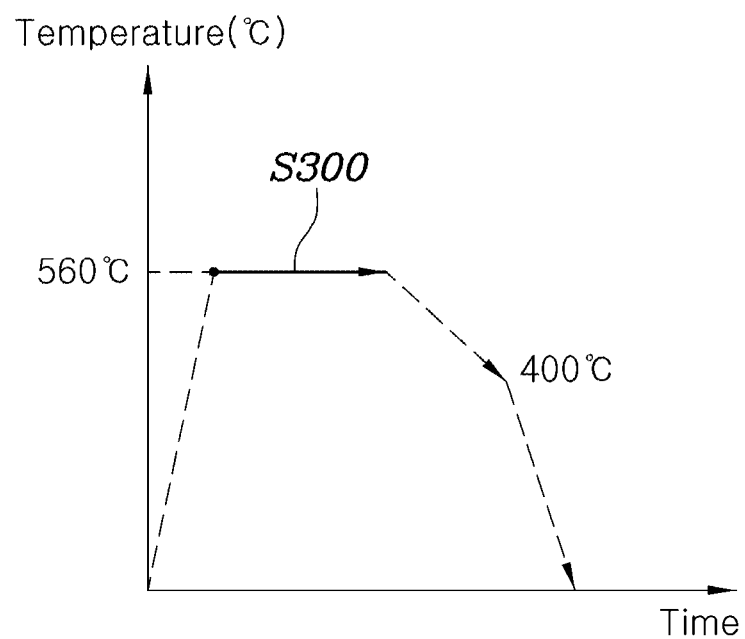
[FIG.3]

[FIG.4]
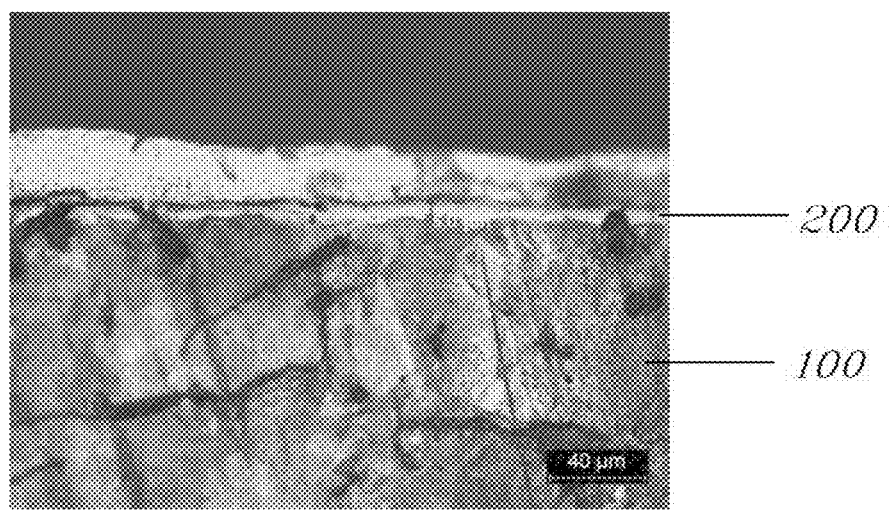

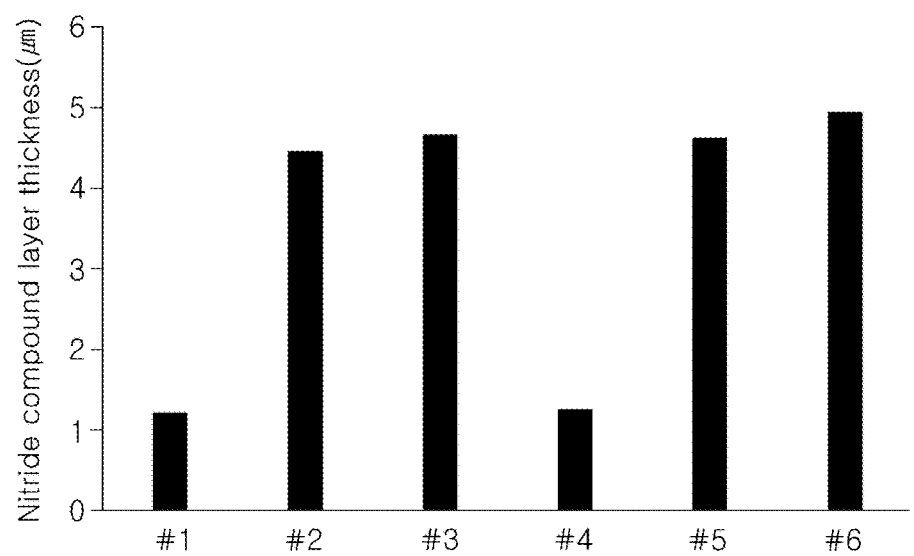
[FIG.5]

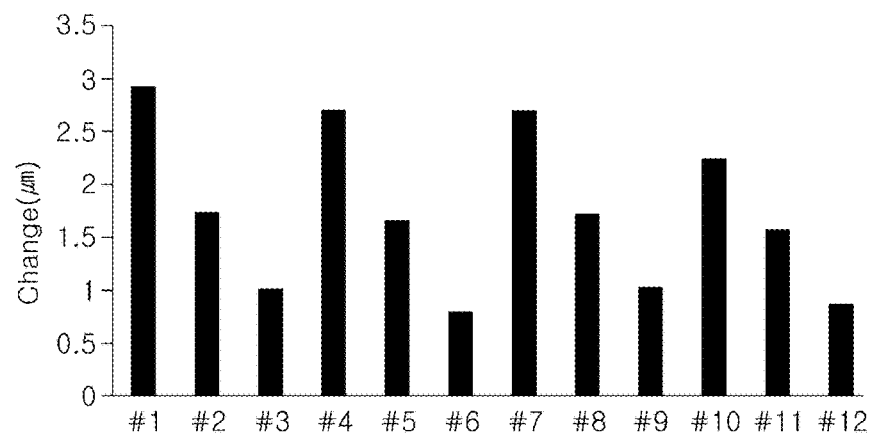

[FIG. 7]
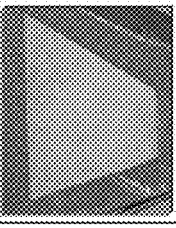

[FIG. 8]

| Test time | Ventilated-type disk | | | | | |
|---|---|---|---|---|---|---|
| | Stress-relief annealing [ Amount of C (wt%)] | | | No stress-relief annealing [ Amount of C (wt%)] | | |
| | #7 (3.75~3.85) | #8 (3.65~3.75) | #9 (3.55~3.65) | #10 (3.75~3.85) | #11 (3.65~3.75) | #12 (3.55~3.65) |
| 3Hf | | | | | | |
| 6Hf | | | | | | |

BRAKE DISK AND MANUFACTURING METHOD THEREOF

CROSS REFERENCE TO RELATED APPLICATION

The present application claims priority of Korean Patent Application No. 10-2017-0171569 filed on Dec. 13, 2017, the entire contents of which is incorporated herein for all purposes by this reference.

BACKGROUND OF THE INVENTION

Field of the Invention

The present disclosure relates to a brake disk and a method of manufacturing the same, and more particularly to an integrated brake disk made of gray cast iron and a method of manufacturing the same.

Description of the Related Art

The conventional manufacture of a brake disk made of gray cast iron typically includes stress-relief annealing and oxynitriding heat treatment.

A brief description of an example of the conventional method of manufacturing a brake disk follows. A brake disk body made of gray cast iron is cast; subjected to stress-relief annealing at about 650° C. for 3 hr to remove residual stress; subjected to nitriding treatment at 570° C. to 610° C. for 8 hr to 11 hr in an atmosphere comprising $NH_3$, $N_2$ and $CO_2$; and oxidized at 550° C. for 10 min to 20 min in a steam atmosphere.

However, the conventional method is problematic in that an excessively long time is required to perform stress-relief annealing and oxynitriding, thus increasing processing costs. As shown in FIG. 1, various kinds of layer structures, including an oxide layer having a thickness of 1 μm to 3 μm; a porous layer having a thickness of 1 μm to 5 μm; a compound layer having a thickness of 5 μm to 20 μm; and a diffusion layer having a thickness of 0.1 mm to 0.5 mm are formed on the surface of the brake disk, making it difficult to exhibit uniform properties.

Therefore, a novel method of manufacturing a brake disk is required by which the brake disk may be manufactured using a process that facilitates manufacturing and increases corrosion resistance.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure has been made keeping in mind the above problems occurring in the related art, and the present disclosure is intended to propose a brake disk and a method of manufacturing the same, in which stress-relief annealing is not performed and corrosion resistance may be increased.

According to one aspect, there is provided a method of manufacturing a brake disk made of gray cast iron, comprising casting a disk body using gray cast iron containing 3.1 wt % to 3.7 wt % of C; machining the surface of the cast disk body; nitriding the disk body by exposing the machined surface to a temperature in the range of 540° C. to 580° C. for 50 min to 70 min; and painting the nitrided disk body.

In the step of nitriding the disk body, a nitride layer having a thickness of approximately 4 μm to 6 μm is formed on the surface thereof.

In the step of nitriding the disk body, a diffusion layer having a thickness of 0.2 mm or less is formed between the disk body and the nitride layer.

In the step of nitriding the disk body, the disk body may be nitrided in an atmosphere comprising $NH_3$, $N_2$ and $CO_2$.

In the step of casting the disk body, the disk body may be cast using the gray cast iron containing 3.1 wt % to 3.6 wt % of C.

According to another aspect, there is provided a brake disk made of gray cast iron, comprising a brake disk body cast using a material comprising approximately 3.1 wt % to 3.7 wt % of C; approximately 1.7 wt % to 2.5 wt % of Si; approximately 0.2 wt % or less (excluding 0 wt %) of P; approximately 0.15 wt % or less (excluding 0 wt %) of S; and the remainder of Fe and inevitable impurities, and a nitride layer having a thickness of approximately 4 μm to 6 μm formed on the surface of the brake disk body.

The brake disk may further include a diffusion layer having a thickness of 0.2 mm or less formed between the brake disk body and the nitride layer.

Also, an oxide layer including iron oxide and a porous layer comprising a plurality of pores are not famed on the surface of the nitride layer.

According to the present disclosure, a brake disk and a method of manufacturing the same can exhibit the following effects.

First, stress-relief annealing is not performed, thus reducing the processing time and cost.

Second, even when only nitriding treatment is carried out, without performing oxidation, equivalent corrosion resistance can be ensured.

Third, even when stress-relief annealing is not performed, a change in disk thickness variation ("DTV") can be maintained low.

BRIEF DESCRIPTION OF THE DRAWINGS

The above and other objects, features and other advantages of the present disclosure will be more clearly understood from the following detailed description when taken in conjunction with the accompanying drawings, in which:

FIG. 1 is a photograph illustrating the cross-section of the surface layer of a conventional brake disk obtained through oxynitriding treatment;

FIG. 2 is a flowchart illustrating the process of manufacturing a brake disk according to an embodiment of the present disclosure;

FIG. 3 is a graph illustrating the processing temperature of the third step in the process of manufacturing a brake disk according to an embodiment of the present disclosure;

FIG. 4 is a photograph illustrating the cross-section of the surface layer of a brake disk manufactured by the process of manufacturing a brake disk according to an embodiment of the present disclosure;

FIG. 5 is a graph illustrating the thicknesses of nitride layers of Examples and Comparative Examples according to the present disclosure;

FIG. 6 is a graph illustrating the DTV change before and after nitriding treatment in Examples and Comparative Examples according to the present disclosure;

FIG. 7 shows the results of a salt-spraying test of samples No. 1 to 6; and

FIG. 8 shows the results of the salt-spraying test of samples No. 7 to 12.

DETAILED DESCRIPTION OF THE INVENTION

The terminology used herein is for the purpose of describing particular embodiments only, and is not intended to be limiting. As used herein, the singular forms are intended to include the plural forms as well, unless the context clearly indicates otherwise. It will be further understood that the terms "comprise", "include", "have", etc., when used in this specification, specify the presence of stated features, integers, steps, operations, elements, components, and/or combinations thereof, but do not preclude the presence or addition of one or more other features, integers, steps, operations, elements, components, and/or combinations thereof.

Unless otherwise defined, all terms including technical and scientific terms used herein have the same meaning as those commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure.

Hereinbelow, a brake disk and a method of manufacturing the same according to exemplary embodiments of the present disclosure will be described in detail with reference to the accompanying drawings.

FIG. 2 is a flowchart illustrating the process of manufacturing a brake disk according to an embodiment of the present disclosure. FIG. 3 is a graph illustrating the processing temperature of the third step in the process of manufacturing a brake disk according to an embodiment of the present disclosure. FIG. 4 is a photograph illustrating the cross-section of the surface layer of a brake disk manufactured by the process of manufacturing a brake disk according to an embodiment of the present disclosure.

As illustrated in FIGS. 2 to 4, the method of manufacturing a brake disk includes the following steps: the first step of casting a disk body 100 using gray cast iron containing 3.1 wt % to 3.7 wt % of C (step S100); the second step of machining the surface of the cast disk body (step S200); the third step of nitriding the disk body by exposing the machined surface to a temperature in the range of 540° C. to 580° C. for 50 min to 70 min to form a nitride layer 200 (step S300); and the fourth step of painting the nitrided disk body (step S400).

In the first step (S100), the brake disk body 100 is cast using a gray cast iron material comprising, for example, 3.1 wt % to 3.7 wt % of C; 1.7 wt % to 2.5 wt % of Si; 0.2 wt % or less of P; 0.15 wt % or less of S; and the remainder of Fe and inevitable impurities.

Here, it is important that the amount of C be controlled to the range of 3.1 wt % to 3.7 wt %, and, preferably, 3.1 wt % to 3.6 wt %.

If the amount of C is less than 3.1 wt %, graphite does not grow in the gray cast iron. Thus, performance pertaining to noise, vibration and hardness ("NVH") of the brake disk may deteriorate. On the other hand, if the amount of C exceeds 3.7 wt %, carbon atoms obstruct the diffusion of nitrogen. Thus, the nitride layer 200 may not uniformly grow, and also, upon nitriding treatment, the DTV change may become excessively large.

If the amount of Si is less than 1.7 wt %, the fluidity of the melt may decrease, thus deteriorating castability. On the other hand, if the amount of Si exceeds 2.5 wt %, the growth of free ferrite may be promoted. Thus, the wear resistance of the disk body 100, which is exposed after wear of the nitride layer 200, may decrease.

If the amount of P exceeds 0.2 wt %, ductility and toughness may decrease. If the amount of S exceeds 0.15 wt %, the fluidity of the melt may decrease, and thus castability may deteriorate and an inverse chill structure may be formed.

The shape and size of the cast brake disk and the casting process do not fall within the scope of the present disclosure, and thus a detailed description thereof will be omitted.

The second step (S200) is machining the surface of the cast brake disk body 100, and may include, for example, rough grinding and finishing.

In the third step (S300), the brake disk body 100 having the machined surface is nitrided, thus forming a nitride layer 200 on the surface thereof.

To this end, the brake disk body is subjected to nitriding heat treatment at 550° C. to 570° C. for about 1 hour in an atmosphere comprising $NH_3$, $N_2$ and $CO_2$, whereby the nitride layer 200 having a thickness of 4 μm to 6 μm, and a diffusion layer (not shown in the figures) having a thickness of 0.2 mm or less, which does not appear on the photograph, are formed on the surface thereof. Here, the nitride layer 200 is disposed at the outermost position. The nitride layer 200 indicates a layer configured such that $Fe_{2-3}N$ and $Fe_4N$ are formed in combination.

When only the nitriding treatment is performed in the third step (S300), an oxide layer and a porous layer resulting from conventional oxynitriding heat treatment are not formed. Here, the oxide layer refers to a layer including iron oxide such as $Fe_2O_3$ and $Fe_3O_4$ formed on the surface of a nitride layer, that is, a nitride compound layer, and the porous layer refers to a layer structure comprising a plurality of pores having a diameter of 0.1 μm to 2 μm formed inside or on the surface of a nitride layer, that is, a nitride compound layer.

In the fourth step (S400), the nitrided brake disk body 100 is coated and painted, resulting in a final product.

Meanwhile, as shown in FIG. 4, the brake disk according to the present disclosure includes a brake disk body 100 and a nitride layer 200.

The brake disk body 100 is cast to form the shape of the brake disk using a material comprising 3.1 wt % to 3.7 wt % of C; 1.7 wt % to 2.5 wt % of Si; 0.2 wt % or less of P; 0.15 wt % or less of S; and the remainder of Fe and inevitable impurities. The nitride layer 200 is formed to a thickness of 4 μm to 6 μm using a combination of $Fe_{2-3}N$ and $Fe_4N$ on the surface of the brake disk body 100. Moreover, a diffusion layer having a thickness of 0.2 mm or less may be further famed between the brake disk body 100 and the nitride layer 200.

Below is a description of Examples and Comparative Examples for the brake disk manufactured by the method of the present disclosure.

FIG. 5 is a graph illustrating the thicknesses of nitride layers, namely nitride compound layers, of Examples and Comparative Examples according to the present disclosure. FIG. 6 is a graph illustrating the DTV change before and after the nitriding treatment in Examples and Comparative Examples according to the present disclosure.

As shown in Table 1 below, a solid-type brake disk composed entirely of a single mass and a ventilated-type brake disk formed with air flow passages were cast.

The material for the brake disk comprised 3.1 wt % to 3.7 wt % of C; 1.7 wt % to 2.5 wt % of Si; 0.2 wt % or less of P; 0.15 wt % or less of S; and the remainder of Fe. The amount of C in the material for the brake disk was adjusted as shown in Table 1 below.

TABLE 1

| No. | Disk type | Stress-relief annealing | Amount of C | Remark |
|---|---|---|---|---|
| 1 | Solid | ○ | 3.80 wt % | Comparative Example 1 |
| 2 | | | 3.69 wt % | Comparative Example 2 |
| 3 | | | 3.58 wt % | Comparative Example 3 |
| 4 | | X | 3.80 wt % | Comparative Example 4 |
| 5 | | | 3.69 wt % | Example 1 |
| 6 | | | 3.58 wt % | Example 2 |
| 7 | Ventilated | ○ | 3.79 wt % | Comparative Example 5 |
| 8 | | | 3.68 wt % | Comparative Example 6 |
| 9 | | | 3.55 wt % | Comparative Example 7 |
| 10 | | X | 3.79 wt % | Comparative Example 8 |
| 11 | | | 3.68 wt % | Example 3 |
| 12 | | | 3.55 wt % | Example 4 |

As shown in Table 1, samples No. 1 to 6 are solid-type brake disks, and samples No. 7 to 12 are ventilated-type brake disks. Samples No. 1 to 3 and No. 7 to 9 were subjected to stress-relief annealing, and samples No. 4 to 6 and No. 10 to 12 were not subjected to stress-relief annealing.

TABLE 2

| No. | Amount of C | Nitride layer thickness (μm) | Remark |
|---|---|---|---|
| 1 | 3.80 wt % | 1.2 (0.9 to 1.5) | Comparative Example 1 |
| 2 | 3.69 wt % | 4.45 (4.1 to 5.0) | Comparative Example 2 |
| 3 | 3.58 wt % | 4.65 (4.1 to 5.3) | Comparative Example 3 |
| 4 | 3.80 wt % | 1.25 (1.0 to 1.5) | Comparative Example 4 |
| 5 | 3.69 wt % | 4.6 (4.1 to 5.1) | Example 1 |
| 6 | 3.58 wt % | 4.95 (4.5 to 5.4) | Example 2 |

As shown in Table 2 and FIG. 5, in Comparative Examples 1 and 4, in which the amount of C exceeded 3.7 wt %, the nitride layer, that is, the nitride compound layer, was formed to a very low thickness of 1.2 μm. In contrast, in Comparative Examples 2 and 3 and Examples 1 and 2, in which the amount of C was 3.7 wt % or less, the nitride layer was formed to an average thickness of about 4 μm to 5 μm, and individual portions thereof were formed so as to have sufficient thicknesses in the range of 4.0 μm to 5.5 μm.

The reason that the thickness of the nitride layer varies depending on the amount of C is because the carbon atoms obstruct the penetration and diffusion of nitrogen atoms. Hence, in order to form the nitride layer to a sufficient thickness, the amount of C has to be limited to 3.7 wt % or less.

TABLE 3

| No. | Measurement portion | DTV before nitriding | DTV after nitriding | DTV change |
|---|---|---|---|---|
| 1 | Outer diameter portion | 1.5 | 4.9 | 3.4 |
| | Central portion | 0.9 | 3.7 | 2.8 |
| | Inner diameter portion | 1.8 | 4.4 | 2.6 |
| 2 | Outer diameter portion | 1.4 | 3.4 | 2 |
| | Central portion | 1.8 | 3.6 | 1.8 |
| | Inner diameter portion | 1.2 | 2.6 | 1.4 |
| 3 | Outer diameter portion | 1.7 | 2.8 | 1.1 |
| | Central portion | 1.6 | 2.6 | 1 |
| | Inner diameter portion | 2.3 | 3.2 | 0.9 |
| 4 | Outer diameter portion | 1.6 | 4.9 | 3.3 |
| | Central portion | 1.3 | 4 | 2.7 |
| | Inner diameter portion | 1.4 | 3.5 | 2.1 |
| 5 | Outer diameter portion | 0.8 | 2.8 | 2 |
| | Central portion | 1.4 | 3.4 | 2 |
| | Inner diameter portion | 1.1 | 2.1 | 1 |
| 6 | Outer diameter portion | 1.6 | 2.2 | 0.6 |
| | Central portion | 1.9 | 2.8 | 0.9 |
| | Inner diameter portion | 2.3 | 3.2 | 0.9 |
| 7 | Outer diameter portion | 1.6 | 4.9 | 3.3 |
| | Central portion | 1.4 | 3.5 | 2.1 |
| | Inner diameter portion | 1.3 | 4 | 2.7 |
| 8 | Outer diameter portion | 0.8 | 2.8 | 2 |
| | Central portion | 1.2 | 2.6 | 1.4 |
| | Inner diameter portion | 1.6 | 3.4 | 1.8 |
| 9 | Outer diameter portion | 1.2 | 2.3 | 1.1 |
| | Central portion | 1.1 | 2.1 | 1 |
| | Inner diameter portion | 1.1 | 2.1 | 1 |
| 10 | Outer diameter portion | 1.3 | 4 | 2.7 |
| | Central portion | 0.8 | 2.8 | 2 |
| | Inner diameter portion | 1.4 | 3.4 | 1.8 |
| 11 | Outer diameter portion | 1.6 | 3.4 | 1.8 |
| | Central portion | 1.8 | 3.6 | 1.8 |
| | Inner diameter portion | 1.2 | 2.3 | 1.1 |
| 12 | Outer diameter portion | 1.7 | 2.8 | 1.1 |
| | Central portion | 1.6 | 2.2 | 0.6 |
| | Inner diameter portion | 2.3 | 3.2 | 0.9 |

As shown in Table 3 and FIG. 6, in samples No. 1, 4, 7 and 10, in which the amount of C exceeded 3.7 wt %, the DTV change before and after nitriding treatment was greater than 2 μm. In contrast, in samples No. 2, 3, 5, 6, 8, 9, 11, 12, in which the amount of C was 3.7 wt % or less, the DTV change before and after nitriding treatment was 2 μm or less, and thus fell within the acceptable range.

In particular, in samples No. 3, 6, 9 and 12, containing 3.6 wt % or less of C, the DTV change was very low, to the level of about 1 μm.

When the amount of C is high upon the formation of the nitride layer, penetration and diffusion of nitrogen atoms are obstructed, and thus the thickness of the nitride layer becomes non-uniform, thus increasing the DTV change.

In this way, regardless of the type of brake disk or whether or not stress-relief annealing is performed, the thickness of the nitride layer or the DTV change may vary depending on the amount of C.

The samples were cut to make test specimens, which were then subjected to a salt-spraying test under the following conditions: a temperature of 33° C. to 37° C.; a humidity of 95% RH; and a pH of 6.5 to 7.2 using a saline having a concentration of 4 w/v % to 6 w/v % at a rate of 0.5 ml/hr to 3 ml/hr.

The results of the salt-spraying test are shown in FIGS. 7 and 8. FIG. 7 shows the test results of samples No. 1 to 6, and FIG. 8 shows the test results of samples No. 7 to 12.

As shown in these drawings, samples No. 1, 4, 7 and 10, in which the amount of C exceeded 3.7 wt %, corroded without exception after a test time of 3 hours. Among the remaining samples, slight corrosion was observed on sample No. 2 after a test time of 6 hours, but other than sample No. 2, the remaining samples did not corrode, even after a test time of 6 hours.

Therefore, in the method of manufacturing the brake disk according to the present disclosure, even when conventional stress-relief annealing is not performed and oxidation in oxynitriding treatment is not carried out, a brake disk having high corrosion resistance and low DTV change and thus superior NVH performance can be manufactured.

Although the embodiments of the present disclosure have been disclosed for illustrative purposes, those skilled in the art will appreciate that various modifications, additions and substitutions are possible, without departing from the scope and spirit of the disclosure as disclosed in the accompanying claims.

Thus, the embodiments of the present disclosure do not limit the spirit of the disclosure, but are provided to explain it. Furthermore, it is to be understood that the scope of protection of the disclosure is set forth by the following claims, and all the technical ideas within the range equivalent thereto are incorporated into the scope of the disclosure.

What is claimed is:

1. A brake disk made of gray cast iron, comprising:
   a brake disk body cast using a material comprising approximately 3.1 wt % to 3.7 wt % of C; approximately 1.7 wt % to 2.5 wt % of Si; approximately 0.2 wt % or less (excluding 0 wt %) of P; approximately 0.15 wt % or less (excluding 0 wt %) of S; and a remainder of Fe and inevitable impurities; and
   a nitride layer having a thickness of approximately 4 μm to 6 μm formed on a surface of the brake disk body.

2. The brake disk of claim 1, further comprising a diffusion layer having a thickness of 0.2 mm or less formed between the brake disk body and the nitride layer.

3. The brake disk of claim 1, wherein an oxide layer including iron oxide and a porous layer comprising a plurality of pores are not formed on a surface of the nitride layer.

* * * * *